US00RE41097E

(19) United States
(12) Reissued Patent
Brück

(10) Patent Number: US RE41,097 E
(45) Date of Reissued Patent: Feb. 9, 2010

(54) GLASSES WITH FLEXIBLE TEMPLES

(75) Inventor: Stefan Brück, Nürnberg (DE)

(73) Assignee: Uvex Arbeitsschutz GmbH, Fürth (DE)

(21) Appl. No.: 29/300,586

(22) Filed: Apr. 11, 2008

Related U.S. Patent Documents

Reissue of:
(64) Patent No.: Des. 555,701
Issued: Nov. 20, 2007
Appl. No.: 29/241,525
Filed: Oct. 31, 2005

(30) Foreign Application Priority Data

Jun. 13, 2005 (EM) ..... 000358684

(51) LOC (9) Cl. ..... 16-06
(52) U.S. Cl. ..... D16/311
(58) Field of Classification Search ..... D16/101, D16/300–330, 332–338, 900; D21/190; D24/110.2; 351/41, 44, 51, 52, 61–63, 83, 86, 90, 103–111, 351/114, 117, 119, 121–124, 128, 130–132, 351/136–139, 153, 158; 2/12, 426–432, 434–437, 2/441, 447–449, 453
See application file for complete search history.

(56) References Cited

U.S. PATENT DOCUMENTS

| | | | | |
|---|---|---|---|---|
| 2,824,309 | A | | 2/1958 | Fleming |
| 5,390,369 | A | | 2/1995 | Tubin |
| D362,011 | S | | 9/1995 | Kolentsi |
| D366,056 | S | | 1/1996 | Wolfe |
| D385,897 | S | | 11/1997 | Lin |
| D413,137 | S | | 8/1999 | Lin |
| D421,449 | S | | 3/2000 | Wolfe |
| D462,980 | S | | 9/2002 | Wolfe |
| D463,477 | S | | 9/2002 | Wiedner |
| D475,390 | S | | 6/2003 | Wang-Lee |
| 7,458,680 | B1 | * | 12/2008 | Cheng ..... 351/110 |
| 7,481,529 | B1 | * | 1/2009 | Chen ..... 351/83 |
| D591,789 | S | * | 5/2009 | Li ..... D16/326 |
| 2005/0105042 | A1 | | 5/2005 | Lin |
| 2006/0126010 | A1 | | 6/2006 | Chen |
| 2006/0279692 | A1 | | 12/2006 | Bruck |

* cited by examiner

*Primary Examiner*—Robert M Spear
*Assistant Examiner*—Barbara B Lohr
(74) *Attorney, Agent, or Firm*—Browdy & Neimark, PLLC

(57) CLAIM

The ornamental design for "glasses with flexible temples," as shown and described.

DESCRIPTION

FIG. 1 is a perspective view,
FIG. 2 is a view from the backside,
FIG. 3 is a view seen from above,
FIG. 4 is a front view,
FIG. 5 is a side view—left,
FIG. 6 is a side view—right; and,
FIG. 7 is a view from the bottom.

1 Claim, 3 Drawing Sheets

Figure 1:
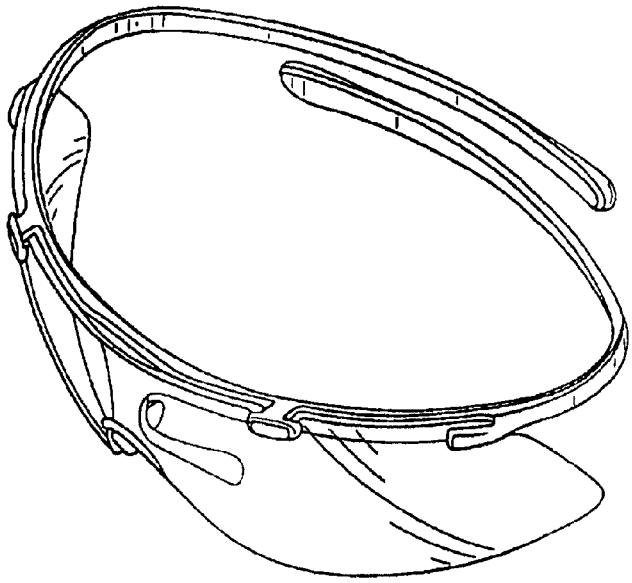
Figure 2:
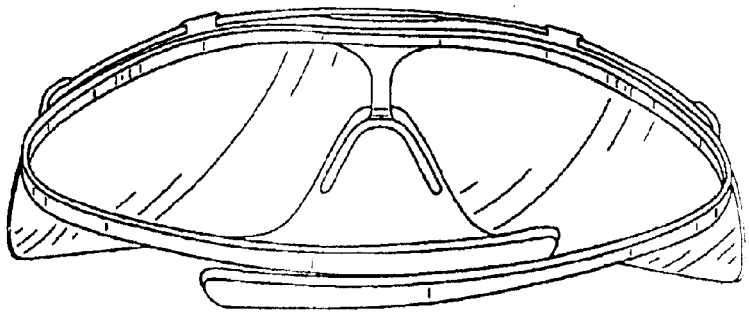
Figure 3:
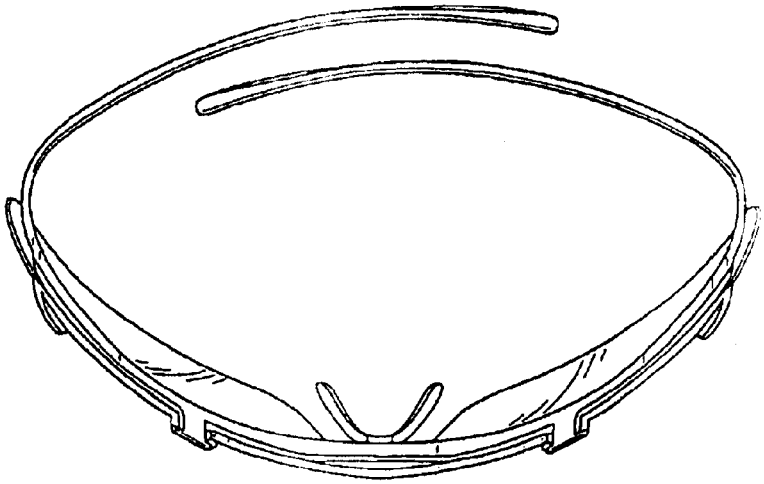
Figure 4:
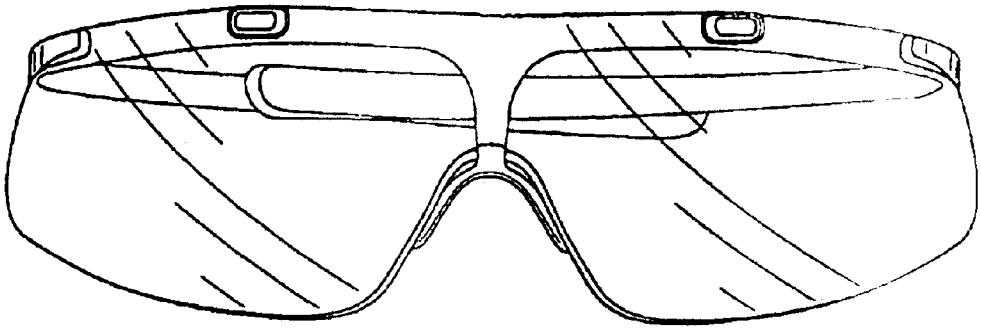
Figure 5:
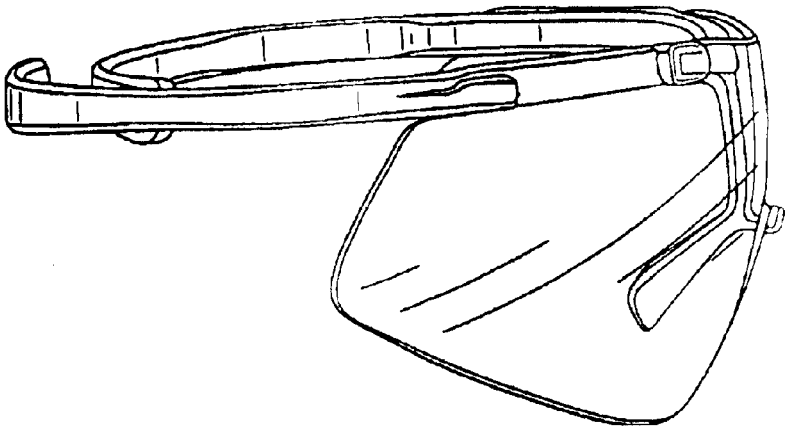
Figure 6:
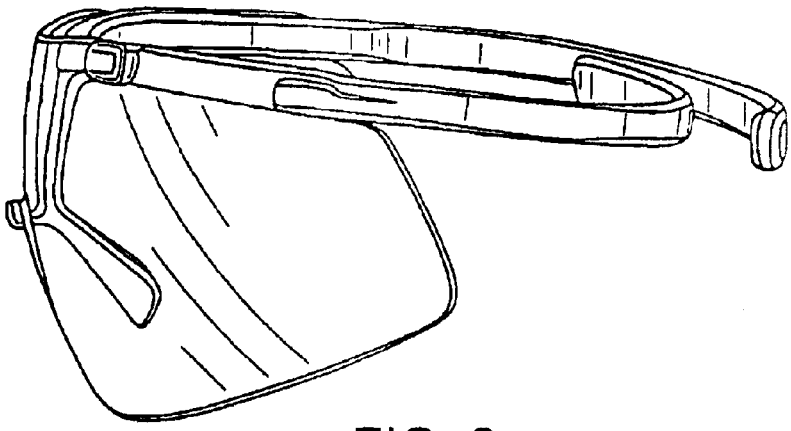
Figure 7:
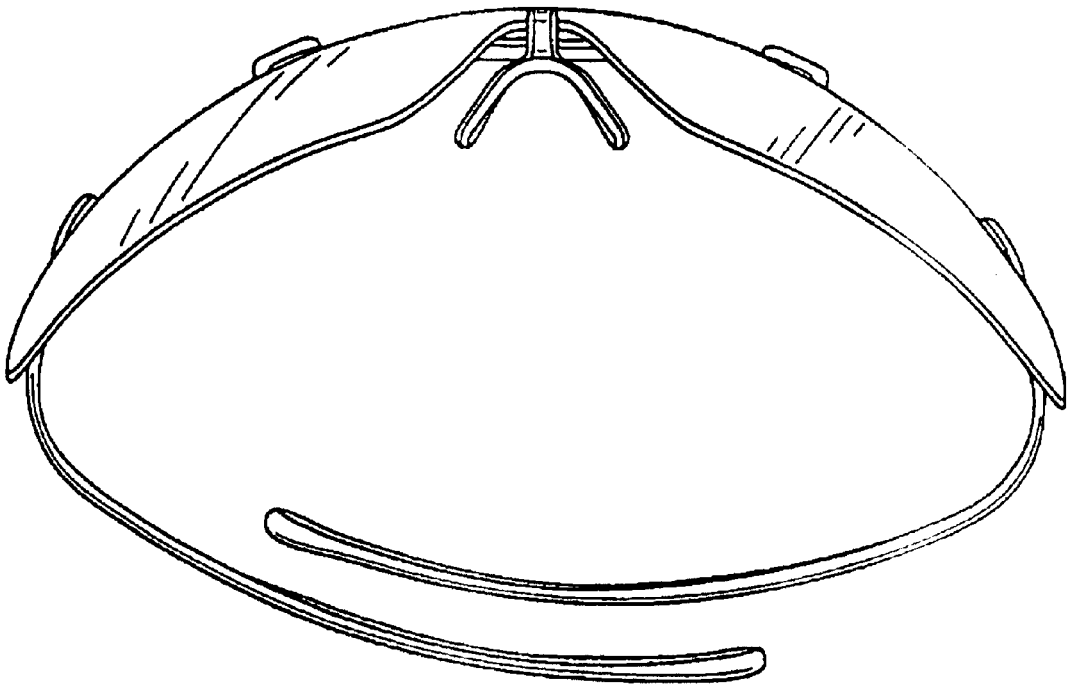

Matter enclosed in heavy brackets [ ] appears in the original patent, but forms no part of this reissue; matter printed in italics indicates the additions made by reissue.